United States Patent [19]

Roberts

[11] Patent Number: 4,619,765
[45] Date of Patent: Oct. 28, 1986

[54] FILTER BOTTOM CONSTRUCTION
[75] Inventor: Robert L. Roberts, Boothwyn, Pa.
[73] Assignee: Roberts Filter Manufacturing Company, Darby, Pa.
[21] Appl. No.: 659,375
[22] Filed: Oct. 10, 1984
[51] Int. Cl.$^4$ .......................................... B01D 23/18
[52] U.S. Cl. ................................. 210/289; 210/293; 210/450; 210/510.1; 405/43
[58] Field of Search ............... 210/275, 279, 289, 291, 210/293, 496, 506, 510.1, 332, 413, 482, 403, 791, 450; 405/43, 45, 36, 47, 46, 51

[56] References Cited
U.S. PATENT DOCUMENTS

| 23,009 | 6/1948 | Camp | 210/293 |
|---|---|---|---|
| 730,518 | 6/1903 | Davis | 210/293 |
| 2,378,239 | 6/1945 | Myron | 210/148 |
| 3,080,062 | 3/1963 | Hebert | 210/293 |
| 3,110,667 | 11/1963 | Stuppy | 210/275 |
| 3,178,026 | 4/1965 | Christy | 210/293 |
| 3,512,649 | 5/1970 | Nebolsine et al. | 210/279 |
| 3,615,019 | 10/1971 | Early, Jr. | 210/293 |
| 3,762,559 | 10/1973 | Knoy et al. | 210/293 |
| 4,214,992 | 7/1980 | Sasano et al. | 210/293 |
| 4,564,450 | 1/1986 | Piper et al. | 210/506 |

Primary Examiner—Richard V. Fisher
Assistant Examiner—Wanda L. Millard
Attorney, Agent, or Firm—Caesar, Rivise, Bernstein, Cohen & Pokotilow

[57] ABSTRACT

A filter block used in the construction of a multi-block filter bottom includes upper and lower lateral sections extending between end walls and being separated from each other by a horizontal petition that includes ports for communicating the upper and lower lateral sections with each other. A removable top wall section includes passages through it for communicating with the upper lateral section, and fastening means are provided for removably securing the top wall section to the remainder of the block.

8 Claims, 4 Drawing Figures

FILTER BOTTOM CONSTRUCTION

BACKGROUND OF THE INVENTION

This invention relates generally to filters, and more specifically to a filter bottom construction employed to support filter media in liquid filters.

Multi-block filter bottoms of the type disclosed in U.S. Pat. No. 3,110,667, issued to Stuppy, have been employed with success in liquid filter systems, e.g., water and wastewater filter systems. The blocks are disposed next to each other in parallel adjacent rows, and then are cemented or grouted in place to form a support structure for gravel and/or other finely divided filter media.

The upper walls of the blocks are provided with passages through which liquid can pass during both the filtering and backwashing operations. The interior of each block is divided into upper and lower laterals separated by a horizontal partition, but interconnected by a plurality of vertical ports formed through the partition.

The above-described multi-block construction is commonly employed in a filter structure having a central flume extending below a concrete bottom wall upon which the multi-block construction is secured. The blocks that are vertically aligned with the flume have at least a portion of their bottom walls removed to provide openings into the lower laterals. These lower laterals communicate with the flume through connecting ports formed through the concrete supporting structure.

During conventional filtration the influent moves in a downstream direction through the filter media, and then through the passages formed in the top walls of the blocks forming the filter bottom. The liquid then moves from the upper laterals into the lower laterals throught the vertical ports in the horizontal partitions, and then along the lower laterals to the cut out regions in the blocks overlying the central flume. At this location the effluent (i.e., the filtered liquid) passes into the flume through the connecting ports in the concrete supporting structure, and then out of the filter.

During backwashing the backwash liquid is introduced into the flume and passes through the connecting ports in the concrete supporting structure into the cut out regions in the blocks overlying the flume. At this point the liquid moves into, and is distributed laterally along the lower laterals. The distributed backwash liquid passes through the ports in the horizontal partitions separating the upper and lower laterals in the various blocks, and then through the passages in the top walls of the blocks and through the filter media to provide the backwashing function.

Although the above-described prior art system provides excellent liquid distribution during backwashing, while permitting the desired flow of influent during filtration, a problem does exist in the repair and maintenance of the system in the event that one or more of the blocks become clogged. For example, if the liquid distribution ports formed in the horizontal partition between the upper and lower laterals in one or more of the blocks become blocked, or if the laterals themselves become blocked, the distribution of backwash liquid can be adversely affected. This can cause uneven flow of backwashing liquid through the filter media, resulting in an undesired disruption of the media bed. Unfortunately, it is not always easy to determine exactly where the blockage exists merely by visually observing the movement of the backwash liquid. In fact, in attempting to locate a blockage it is not uncommon to actually break out one or more blocks that are perfectly good, on the mistaken belief that those blocks actually were the ones that were malfunctioning.

Thus, although the multi-block filter bottom constructions of the prior art are well suited for use during filtering and backwashing operations, they do not permit the easy, non-destructive detection of blockages therein.

OBJECTS OF THE INVENTION

It is a general object of this invention to provide a multi-block filter bottom construction which is easier to inspect than prior art multi-block constructions.

It is a further object of this invention to provide a multi-block filter bottom construction which can be internally inspected without either removing or breaking the blocks.

It is a further object of this invention to provide a multi-block filter bottom construction which is easier to repair and/or clean than prior art multi-block constructions.

It is a further object of this invention to provide a unique block for use in fabricating a multi-block filter bottom fulfilling the above-indicated objects of this invention.

SUMMARY OF THE INVENTION

The above and other objects of this invention are achieved in a multi-block filter bottom construction having a plurality of filter blocks disposed in parallel adjacent rows extending between side walls of a filter and with the blocks in each row placed end-to-end. The filter blocks include upper and lower lateral sections extending horizontally between the end walls. These upper and lower laterals sections are separated by horizontal partitions, but are interconnected by vertical ports extending through said partitions. The invention is characterized by providing one or more blocks in the multi-block construction with a removable top wall having passages therethrough for communicating with the upper lateral section(s), and fastening means for removably securing the top wall to the remainder of the block and for permitting removal of the top wall without destroying or otherwise damaging the block.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS OF THE INVENTION

Figure 1:
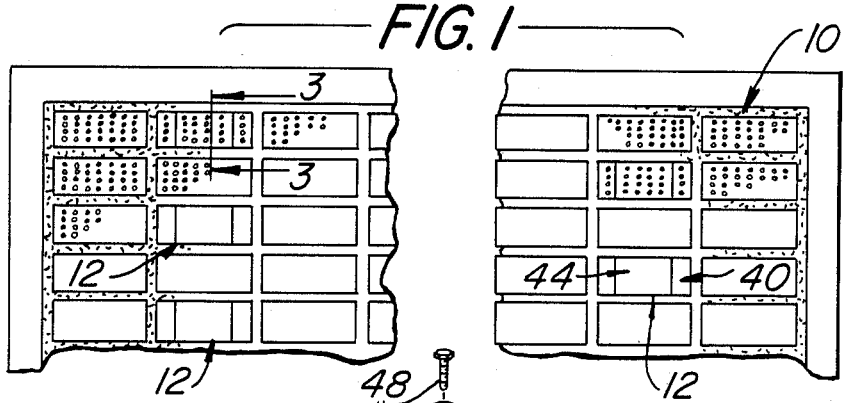
FIG. 1 is a fragmentary partial plan view of a multi-block filter bottom employing a plurality of filter blocks in accordance with this invention.

Referring now in greater detail to the various figures of the drawings wherein like reference characters refer to like parts, a multi-block filter bottom construction embodying the present invention is generally shown at 10 in FIG. 1. The filter-bottom construction 10 can employ many prior art filter-blocks of the type disclosed in U.S. Pat. No. 3,110,667, the subject matter of which is herein incorporated by reference. However, in accordance with the present invention, one or more filter blocks 12 of this invention are actually located in predetermined positions to permit the interior of the multi-block construction to be inspected and cleaned in an easy and reliable manner, without the necessity of breaking out or otherwise destroying perfectly good blocks in the construction.

The specific number and location of the blocks 12 in a particular filter bottom construction 10 is a matter of choice, but most desirably is selected to permit the visual inspection of all of the blocks forming the filter bottom construction. It should be appreciated that the various blocks making up the bottom are grouted or cemented together, thereby requiring a significant effort to physically remove a block from the system. In accordance with this invention, it is easy to inspect the interior of the various blocks to determine exactly where a blockage exists, and thereby eliminate the need for removing perfectly good blocks from the system based on the mistaken belief that they are the ones that were clogged.

Figure 2:
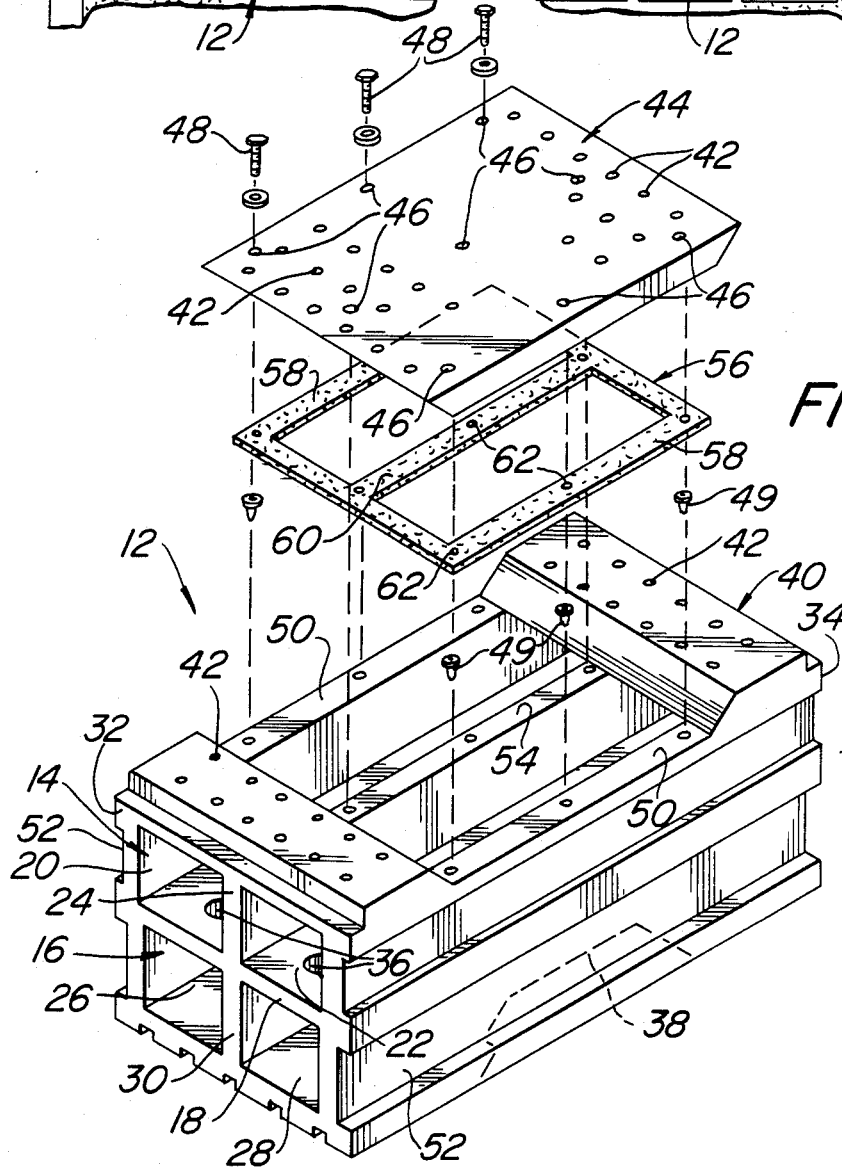
FIG. 2 is an enlarged, exploded isometric view of a filter block of this invention.
Figure 3:
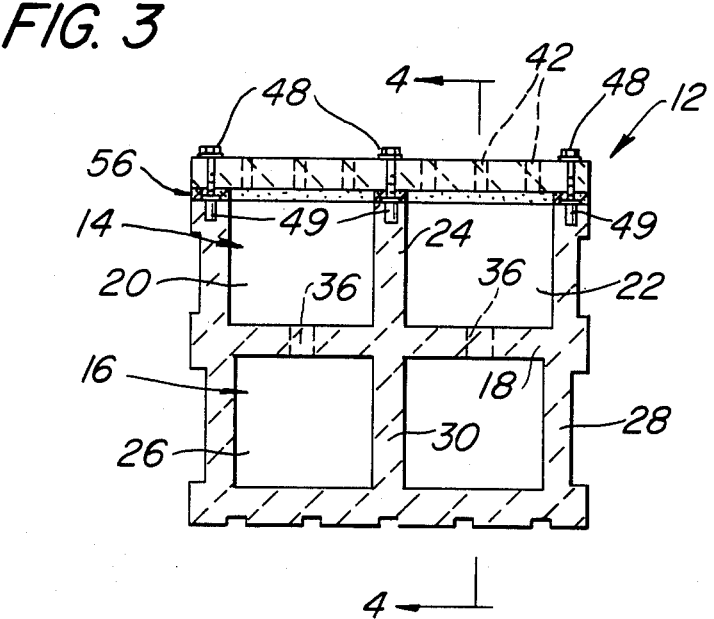
FIG. 3 is a sectional view taken along line 3—3 of FIG. 1.
Figure 4:
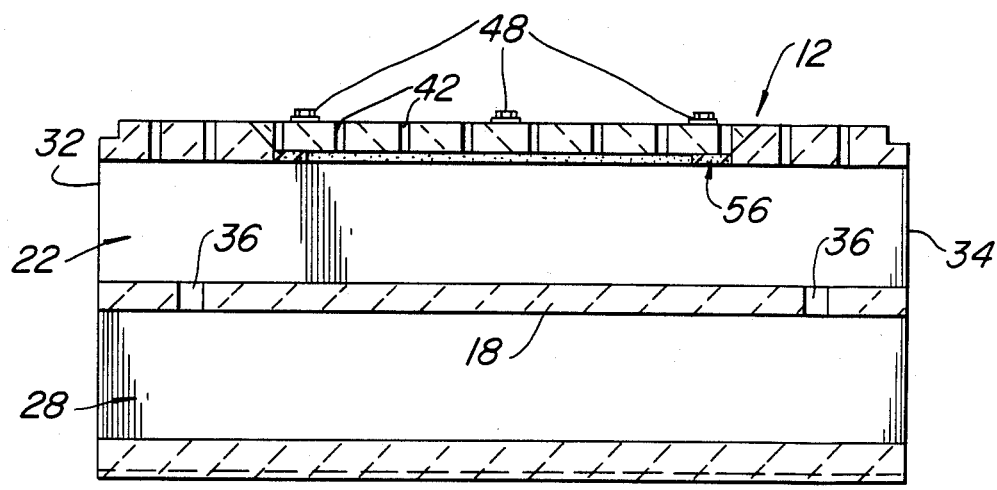
FIG. 4 is a sectional view taken along line 4—4 of FIG. 3.

Referring to FIGS. 2 through 4, the filter block 12 in accordance with this invention is provided with upper and lower lateral sections 14 and 16 separated by a horizontal partition 18. In the illustrated embodiment, the upper lateral section includes two channels 20 and 22 separted by an upper vertical partition 24. The lower lateral section 16 likewise includes two parallel channels 26 and 28 separated from each other by a lower vertical partition 30.

In the illustrated embodiment the upper and lower lateral sections 14 and 16 are each formed of two parallel channels; however, reference throughout this application to the upper lateral section or the lower lateral section includes an arrangement of one or more channels in each section, unless specifically indicated otherwise. Although the preferred construction includes upper and lower lateral sections which extend through opposed end walls 32 and 34 of the block, it is within the scope of this invention to form one or more of the lateral sections with a closed end, as is exemplified in U.S. Pat. No. 2,378,239, issued to Myron. The subject matter of the Myron patent is herein incorporated by reference.

Referring specifically to FIGS. 3 and 4, the block 12 of this invention includes a plurality of vertically aligned ports 36 extending through the horizontal partition 18 to interconnect each of the upper channels 20 and 22 with its underlying lower channel 26 and 28, respectively. The ports 36 permit the influent to flow from the upper channels into the lower channels for ultimate passage through cutout regions in the bottom wall of the blocks that overlie the lower lateral flume of the filter, in the same manner as described in the earlier referenced Stuppy patent (U.S. Pat. No. 3,110,667). It should be understood that the blocks of this invention can be employed in any location of the multi-block construction 10, including the location over the lower lateral flume of the filter. In this latter location the blocks will have a cutout region in their bottom walls, such as is indicated in dotted line representation at 38 in FIG. 2, and as is shown in the above-referenced Stuppy patent.

The construction of the block 12 described thus far is similar to the prior art construction discussed earlier. However, in accordance with this invention a top wall 40, having passages 42 therethrough for communicating the top wall 40 with the upper lateral section 14, includes a removable section 44 located intermediate the end walls 32 and 34. Referring to FIGS. 2 and 3, a plurality of passages 46 for receiving removable fastening means 48, such as screws, are formed vertically through the removable section 44, and into the upper surfaces 50 of the side walls 52 and into the upper exposed surface 54 of the upper vertical partition 24. The use of the removable fastening means 48 permits the removable section 44 to be secured to, and removed easily from the remainder of the block 12. Most preferably, when the fastening means are screws, plastic anchor inserts 49 are employed in the passages 46 for receiving the threaded ends of such screws.

In order to provide effective isolation between the individual channels 20 and 22 of the upper lateral section 14 a sealing means preferably is provided between the main body of the block 12 and the removable top section 44. Preferably the sealing means is in the form of a gasket 56; however, a pliable caulking material also may be usable instead of the gasket.

As can be seen best in FIG. 2, the gasket 56 includes end walls 58 and an intermediate wall 60 adapted to be supported on the upper exposed surfaces 50 and 54 upon which the removable top section 44 is adapted to be supported and secured. In addition, the gasket includes a set of passages 62 adapted to align with the passages 46 when it is positioned between the body of the block 12 and the removable top section 44.

The blocks 12 of this invention preferably are formed from a premixed clay by a continuous extrusion process, wherein a continuous multi-block section initially is formed as a single unit. The extrusion operation is then followed by a cutting operation to separate the continuous extrusion into the separate blocks employed to form the bottom construction. Either after or before the cuttng operation, the top surface is punched to provide the desired drainage passages 42 and the interior horizontal partition 18 likewise is punched to form the interconnecting ports 36 between the upper and lower lateral sections 14 and 16. When the block is intended to overlie and communicate with the central flume of the filter, an additional special cutting operation is employed to remove a section of the bottom wall of the block.

In accordance with a unique aspect of the present invention, a separate cutting operation is employed to form the removable top section 44. Most preferably, the punching operation employed to actually form the vertical passages 42 through the top wall 40 also forms the passages 46 that are adapted to receive the removable fastening means 48. This is accomplished by initially punching the vertical passages 46 through the top wall 40, and then cutting the top wall section 44 from the block 12 at a location intermediate the opposed vertical ends of the vertical passages 46.

The filter block 12 of this invention can be located, or distributed in a variety of different locations in the multi-block construction 10. Most preferably the number and location of the blocks 12 are selected to permit the visual inspection of the entire network of channels in the upper lateral sections 14. As a result of this arrangement, regions of the filter bottom construction 10 which are blocked or otherwise damaged can be visually discovered, thereby eliminating the need for physically breaking our properly functioning blocks on the mistaken belief that they were the ones that had malfunctioned.

Without further elaboration, the foregoing will so fully illustrate the invention, that others may, by applying current or future knowledge, adopt the same for use under various conditions of service.

What is claimed as the invention is:

1. A filter block used in the construction of a multi-block filter bottom on which filter media is supported, wherein a plurality of filter blocks are disposed in parallel adjacent rows extending between side walls of a filter and with the blocks placed end-to-end within each row, said filter block including upper and lower lateral sections extending between end walls of said block and being divided by a horizontal partition, means defining ports through said partition for communicating the upper and lower lateral sections with each other, a removable top wall section above which the filter media is retained, said top wall section having passage means therethrough for communicating with the upper lateral section and fastening means for removably securing the top wall section to the remainder of the block.

2. The filter block of claim 1 characterized by vertically extending sidewalls and a vertically extending partition between said sidewalls for dividing said upper lateral section into adjacent, parallel channels, said vertically extending sidewalls and vertically extending partition including openings in upper surfaces thereof for receiving the fastening means employed to removably secure the top wall section to the remainder of the block.

3. The filter block of claim 1 characterized in that said block is extruded as part of a unitary member including a top wall continuously formed with adjacent side walls wherein said removable top wall section is formed from the top wall by a separating operation subsequent to the extrusion operation.

4. The filter block of claim 1 characterized by a sealing means between the removable top wall section and the remainder of the block.

5. The filter block of claim 4 characterized in that the sealing means is a gasket.

6. The filter block of claim 4 characterized in that the sealing means is a pliable caulking material.

7. A liquid filter system including a multi-block filter bottom and filter media supported thereby, said filter bottom including a plurality of filter blocks disposed in parallel adjacent rows extending between sidewalls of a filter and with the blocks placed end-to-end within each row, said filter blocks including upper and lower lateral sections extending between end walls of said blocks and being divided by a horizontal partition, means defining ports through said partition for communicating the upper and lower lateral sections with each other, one or more of said blocks including a removable top wall section above which the filter media is retained, each of said top wall sections having passage means therethrough for communicating with the upper lateral section and fastening means for removably securing each removable top wall section to the remainder of its respective block.

8. The liquid filter system of claim 7 characterized by a sealing means between each removable top wall section and the remainder of the block to which it is secured.

* * * * *